(No Model.) 2 Sheets—Sheet 1.

L. HOLLINGSWORTH.
ADJUSTABLE BEARING FOR JOURNALS.

No. 526,131. Patented Sept. 18, 1894.

Witnesses:
H. Traham
Louis M. F. Whitehead.

Inventor
Loftus Hollingsworth
By Dayton, Poole & Brown,
Attys.

(No Model.) 2 Sheets—Sheet 2.
L. HOLLINGSWORTH.
ADJUSTABLE BEARING FOR JOURNALS.
No. 526,131. Patented Sept. 18, 1894.
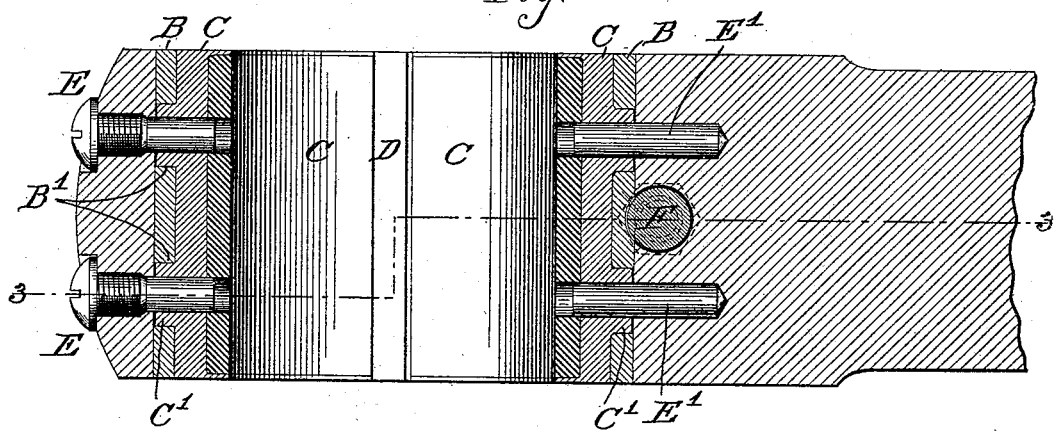
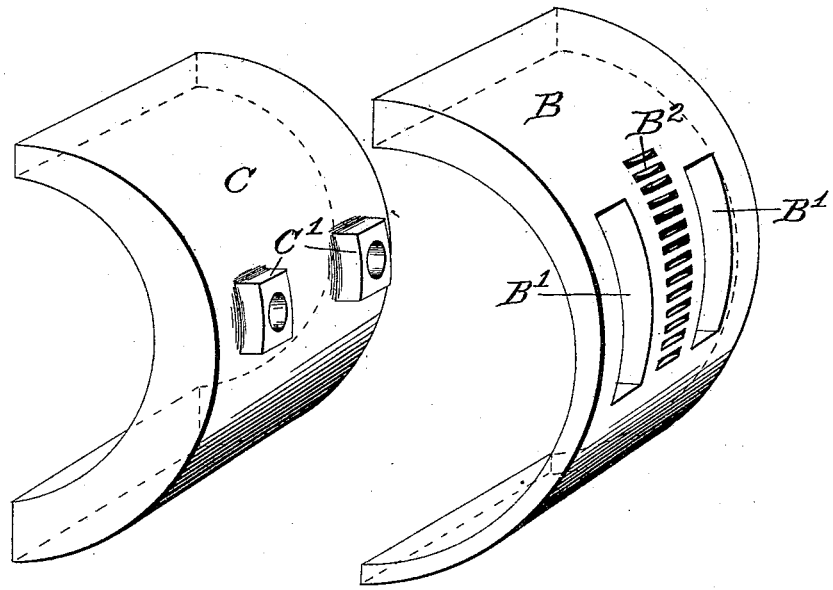
Witnesses:
Inventor
Loftus Hollingsworth.
By Dayton, Poole & Brown.
Attys.

UNITED STATES PATENT OFFICE.

LOFTUS HOLLINGSWORTH, OF CHICAGO, ILLINOIS.

ADJUSTABLE BEARING FOR JOURNALS.

SPECIFICATION forming part of Letters Patent No. 526,131, dated September 18, 1894.

Application filed May 2, 1893. Serial No. 472,695. (No model.)

*To all whom it may concern:*

Be it known that I, LOFTUS HOLLINGSWORTH, of Chicago, in the county of Cook, and State of Illinois, have invented certain new and useful Improvements in Adjustable Bearings for Journals; and I do hereby declare that the following is a full, clear, and exact description thereof, reference being had to the accompanying drawings, and to the letters of reference marked thereon, which form a part of this specification.

This invention relates to adjustable bearings for journals, being more especially intended for use on connecting and side rods of engines and other machinery, though it is adapted for use in other situations.

One object of the invention is to provide a construction by which the center or axis of the bearing may be permanently preserved during the act of adjustment, or, in other words, in which the movable parts of the bearing are equally moved toward or from the axis and said axis is, therefore, undisturbed.

Another object of the invention is to provide a construction in which the parts concerned in making the adjustment may be inexpensively and at the same time accurately formed by lathe work, rather than by planing, as is the case in the ordinary adjustable boxes in which the movable parts and the wedges for moving them have plane surfaces.

The invention consists essentially in a bearing the adjustable and adjusting parts of which are in the form of reversely placed, circularly curved wedges.

Figure 1:
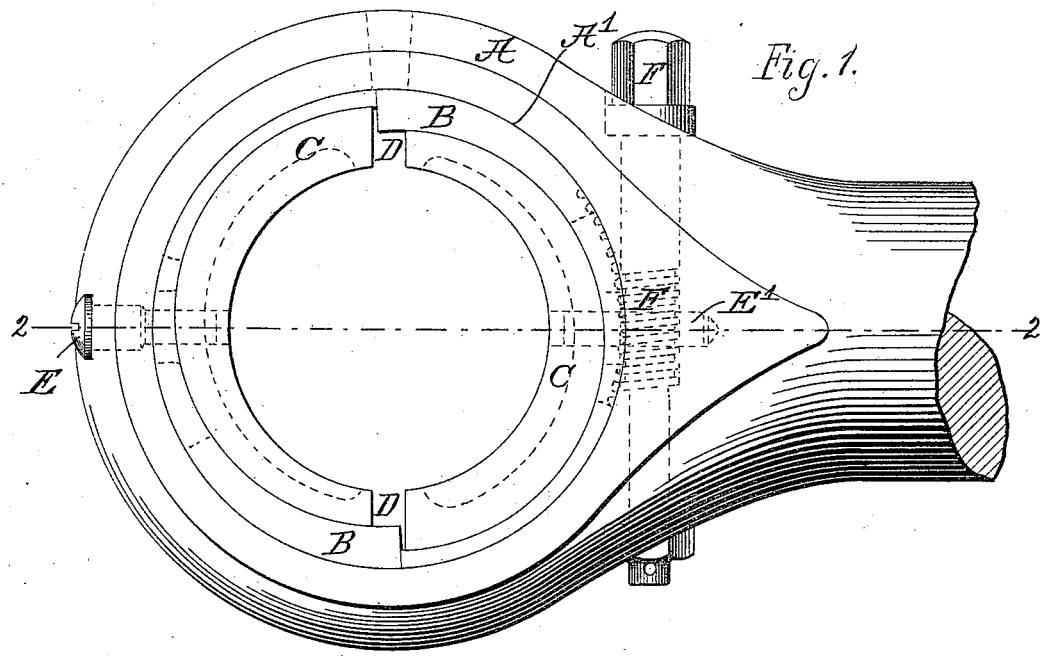
Figure 3:
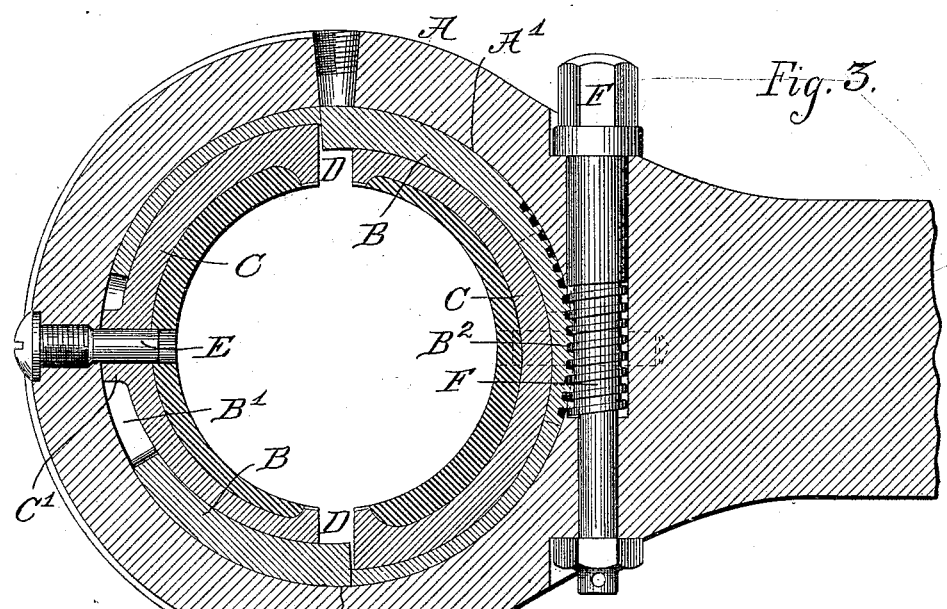

The accompanying drawings show an embodiment of my invention in what I believe to be its most perfect form, Figure 1 being a side elevation of a head of a connecting rod provided with my improved adjustable interior bearing; Fig. 2, an axial section in the line 2—2 of Fig. 1; Fig. 3, a transverse section in the line 3—3 of Fig. 2; Fig. 4, a perspective outside view of one of the bearing blocks detached, and Fig. 5 a perspective outside view of one of the particular wedges detached.

A represents the solid head of a connecting rod of which A' is the aperture for the bearing-blocks.

B B are two semi-circular wedges having both their outer and their inner surfaces parti-circular and externally fitted to the circular wall of the aperture A' of the head and arranged to contact with each other at their ends, the thinner end of one of said wedges bearing against the thicker end of the other.

C C are two wedge-shaped bearing-blocks or "brasses," also having both their outer and their inner surfaces parti-circular and externally fitted to the inner surfaces of the wedges. They also have the same taper as the wedges and are placed within the latter in the reversed position shown, or with their thicker portions resting against the thinner portions of said wedges. As a consequence of this construction and arrangement, the inner parti-circular surfaces of the bearing-blocks C C are concentric with the circular opening A' in the head A. While the wedges B B, as shown, together form a complete circle and bear against each other at both ends, the bearing-blocks C C have spaces D D between their ends, as clearly shown in Figs. 1, 2 and 3, said spaces being for the purpose of allowing the bearing-blocks to be moved toward each other or toward the center of the bearings by lengthwise or circular movement of the wedges B. Each of the wedges is provided with preferably two circumferential slots B' B' through which radial pins E E' may pass from the surrounding head into the bearing-blocks for the purpose of preventing lengthwise or circular displacement of said bearing-blocks within the head A, and, in order that any force of friction, tending to give such displacement to said bearing-blocks, may exert a more direct shearing strain and less bending strain upon said pins, the bearing-blocks are desirably provided with the lugs C' C', projecting into or through said slots B' B' into proximity with the inner surface of the head. It is evident that when the parts A, B and C are combined and arranged in the manner shown, a lengthwise or circular movement imparted to one of the semicircular wedges B will push the other of said wedges in the same direction and, that (the bearing-blocks C being held from lengthwise movement) such movement of the wedges will contract or relax the bearing-blocks about a journal or wrist-pin embraced by them, the radial movement of said bearing-blocks being equal and the axis of the bearing being, therefore, preserved.

The means shown and preferred for giving adjusting movement to the wedges B is a worm F arranged in an aperture of the head which opens into the aperture A' of said head at a point allowing said worm to engage a rack B² in the outer surface of the adjacent wedge. The worm F is here shown as having a shaft which passes entirely through the head A on the side of the latter at which it is joined with the connecting rod and opposite the middle of the adjacent bearing-block C. It may, if desired, be placed on the opposite side of the bearing or in any position adapted to afford suitable engagement with the wedge throughout any required movement of the latter. The worm being placed midway between the opposite ends of the bearing, two pins E E' are employed to steady the bearing-blocks, one on each side of said worm, and the wedges B are provided with a corresponding number of the slots B' and the blocks C with a corresponding number of lugs C', for the support of said pins.

Other means than a worm may obviously be employed to give the desired movement to the wedges B and changes may be made in other details of the device without departure from the invention. For example, it is obvious that certain advantages of my invention may be obtained by making the wedges B B less than full semicircles in length and employing separate means for adjusting each of said wedges, the effect of such construction being that the center of the bearing may be changed by unequal movement of the wedges permitted by the space afforded between their ends. This will be within the invention as hereinafter claimed, except as to those claims in which the wedges together form a complete circle and insure the preservation of the center during adjustment. Both the wedges and the bearing-blocks of the construction shown, as well as the aperture in the head, may be turned to form in a lathe, with the advantages of utmost accuracy and least possible cost.

I claim—

1. The combination, with a head provided with a circular aperture, of parti-circular, wedged shaped bearing blocks, parti-circular wedges interposed between the walls of the aperture and the outer surface of the bearing blocks, and means for securing relative adjustment between the wedges and bearing blocks, substantially as described.

2. The combination with a head having a circular aperture, of parti-circular, wedge-shape bearing-blocks, means for holding said blocks against circular movement, parti-circular wedges interposed between said bearing blocks and the wall of the surrounding opening, and means for giving adjustment to the wedges.

3. The combination with a head or other part having a circular aperture, of a plurality of parti-circular wedge-shaped bearing-blocks arranged within said opening, means for retaining the bearing-blocks against circular movement, parti-circular wedges interposed between said blocks severally and the walls of the opening and having contact with each other at their ends, and means for adjusting said wedges.

4. The combination with a head having a circular opening, of parti-circular, wedge-shaped bearing-blocks, parti-circular wedges provided with slots and interposed between the bearing-blocks and the walls of the opening, radial pins passing through the slots of the wedges and engaging both the head and the bearing-blocks, and means for adjusting the wedges.

5. The combination, with a head having a circular opening, of parti-circular, wedge-shaped bearing-blocks provided with lugs on their convex surfaces, parti-circular wedges provided with slots for said lugs and interposed between the bearing-blocks and the walls of the opening, radial pins entering the lugs and also entering the head, and means for adjusting the wedges.

6. The combination, with a head having a circular opening, of parti-circular, wedge-shaped bearing-blocks, parti-circular wedges interposed between the bearing-blocks and the walls of the opening, a rack on one of said wedges and a worm mounted in the head and engaged with said rack, whereby the bearing blocks and wedges may be adjusted relatively to each other.

In testimony that I claim the foregoing as my invention I affix my signature in presence of two witnesses.

LOFTUS HOLLINGSWORTH.

Witnesses:
M. E. DAYTON,
ALBERT H. GRAVES.